United States Patent [19]

Hughes

[11] 4,115,508

[45] Sep. 19, 1978

[54] POLYMERS AND ROTATIONALLY MOLDING SAME

[75] Inventor: James K. Hughes, Bartlesville, Okla.

[73] Assignee: Phillips Petroleum Company, Bartlesville, Okla.

[21] Appl. No.: 802,081

[22] Filed: May 31, 1977

[51] Int. Cl.$^2$ .......................... B29C 5/04; C08K 3/04
[52] U.S. Cl. ................... 264/310; 260/42.42; 526/19; 526/21; 526/57
[58] Field of Search ............... 260/42.42; 526/19, 21, 526/57; 264/310

[56] References Cited

U.S. PATENT DOCUMENTS

| | | | |
|---|---|---|---|
| 3,214,422 | 10/1965 | Mageli et al. | 260/42.42 |
| 3,415,799 | 12/1968 | Helm | 528/501 |
| 3,836,595 | 9/1974 | Johnson et al. | 526/130 |
| 3,959,178 | 5/1976 | Hogan | 526/349 |

OTHER PUBLICATIONS

Williams et al., Tech. Ser. Report., "The Effect of the Chemical and Physical Properties of Carbon Black on its Performance in Polyethylene", Cabot Corp. 1963, pp. 38–41.

*Primary Examiner*—James H. Derrington

[57] ABSTRACT

A composition that can be rotationally molded with a minimum formation of bubbles comprises solid polymer, a cross-linking agent, a solid pigment in an amount to provide a surface area up to 30 m$^2$/100 grams of polymer, and a transition metal catalyst residue content of less than about 3 parts per million.

22 Claims, No Drawings

POLYMERS AND ROTATIONALLY MOLDING SAME

BACKGROUND OF THE INVENTION

The invention relates to a composition of matter and to a method of rotationally molding same.

In the last 25 years or so, there has been a tremendous growth in the use of plastics to produce a variety of consumer goods and industrial products. Such materials lend themselves to different production methods and techniques. Frequently the production method is dictated by the particular article to be manufactured. For example, production of large plastic articles is accomplished for the most part by rotational molding, or at least the rotational molding process finds particular applicability in the production of large hollow products. Ethylene polymers, homopolymers as well as copolymers, are used extensively in rotational molding applications. In many instances the ethylene polymers used for rotational molding are compounded with various crosslinking agents and additives which stabilize the properties of the molded polymer when exposed to heat, light, etc., as is well known in the art. However, it has been found that the presence of such additives, while solving one problem, can create another problem. One such problem that is created when solid pigments are added to the polymer along with a crosslinking agent is the formation of bubbles. The bubbles are undesirable since they can be relatively large, e.g., up to about ⅛ inch (3.2 mm) in diameter or more, can extend to each surface of the walls and can terminate in pin hole or larger openings. As a result, articles produced from this type of polymer are unsuitable for many uses. Also, the appearance and the impact strength of the molded articles can be adversely affected by a large bubble population.

An object of the invention is a composition of matter suitable for producing rotationally molded articles with a minimum formation of bubbles.

Another object of the invention is the production of rotationally molded articles from polymers with a minimum formation of bubbles.

Another object of the invention is the reduction or elmination of the bubbles formed when rotationally molding ethylene polymers containing solid pigments and crosslinking agents.

SUMMARY OF THE INVENTION

According to the invention a composition of matter comprises an ethylene homopolymer and/or copolymer thereof having a transition metal catalyst residue content of less than 3 parts per million, a crosslinking amount of a suitable crosslinking agent and a solid pigment in an amount to provide a surface area of up to 30 square meters per 100 grams of polymer.

Further according to the present invention rotationally molding the above composition produces articles having a minimum formation of bubbles.

DETAILED DESCRIPTION OF THE INVENTION

Polymers suitable for use in the invention include ethylene polymers broadly and are selected from homopolymers of ethylene and copolymers of ethylene and at least one acyclic mono-1-olefin hydrocarbon having 3 to 8 carbon atoms per molecule and mixtures thereof. Because of availability the preferred copolymers of ethylene are those employing straight chain comonomer hydrocarbons having 3 to 6 carbon atoms per molecule. Such copolymers are generally formed from at least 75 weight percent ethylene, although copolymers formed from at least 90 weight percent ethylene are more commonly produced. The polymers and copolymers used in the invention frequently have a melt index, as determined by ASTM D 1238, Condition E, of at least about 10 and a density ranging from about 0.920 to about 0.970 grams/cm$^3$.

Polymers other than polyetheylene include, for example, copolymers of ethylene and propylene, isobutene, 1-pentene, 3-methyl-1-butene, 1-hexene, 4-methyl-1-pentene, 1-heptene, 1-octene, and 4-ethyl-1-hexene.

Compounds suitable for use as crosslinking agents in accordance with the invention include for example the compounds disclosed in U.S. Pat. No. 3,214,422, issued to Mageli et al., Oct. 26, 1965. These compounds are acetylenic diperoxy compounds and include hexynes having the formula

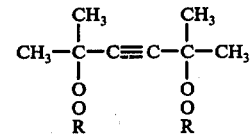

octynes having the formula

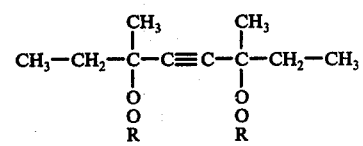

and octadiynes having the formula

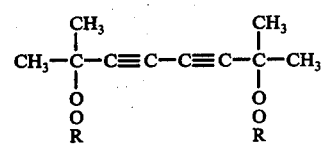

and wherein R is selected from the group consisting of tertiary alkyl, alkyl carbonate, and benzoate. In general, the molecular weights of the poly peroxides fall within the range of 230 to 550. Excellent results are achieved with the above-noted hexynes. Among the compounds encompassed within the above-noted hexynes, octynes and octadiynes are included:

2,7-Dimethyl-2,7-di(t-butylperoxy)octadiyne-3,5
2,7-Dimethyl-2,7-di(peroxy ethyl carbonate)octadiyne-3,5
3,6-Dimethyl-3,6-di(peroxy ethyl carbonate)octyne-4
3,6-Dimethyl-3,6-di(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(peroxy ethyl carbonate)hexyne-3
2,5-dimethyl-2,5-di(alpha-cumyl peroxy)hexyne-3
2,5-Dimethyl-2,5-di(peroxy beta-chloroethyl carbonate)hexyne-3
2,5-Dimethyl-2,5-di(t-butylperoxy)hexyne-3

The amount of organic peroxide employed is a crosslinking amount which can be selected over a broad range. Generally the amount of the crosslinking agent employed, based on weight of polymer, ranges from about 0.1 to about 10 weight percent. Broad concentrations ranging from about 0.2 to about 5 weight percent based on the weight of the polymer can be employed; however, it has been found that the best properties of the rotationally molded article are obtained employing organic peroxide concentrations ranging from about 0.5 to about 1.0 percent based on the weight of the polymer.

Some of the solid pigments useful in the present invention include for example any of the known varieties of carbon black including for instance furnace black, channel black, thermal black and the like. Also iron oxide black has been employed with good results. Any of the carbon blacks in Groups 2 through 9 according to ASTM 2516-75 are suitable for use in the invention; however, the quantity of these solid pigments employed must not exceed that amount to provide a surface area of up to 30 square meters per hundred grams of polymer. Good results have been obtained employing an amount to provide a surface area of less than 25 square meters per hundred grams of polymer. Specific surface areas of the solid pigments employed are determined with nitrogen according to ASTM D-3037-76. Carbon blacks within the Groups 5 through 9 are presently preferred because higher concentrations of carbon black can be employed for a given surface area of pigment per gram of polymer as compared to a carbon black within Groups 2 and 3. Since the carbon blacks in the various groups have different surface areas per gram, the concentrations of carbon black employed in the compositions of the present invention vary with respect to the carbon black employed. For example, a carbon black within Group 3, such as N-330, has a surface area of about 80 square meters per gram and in order to practice the invention the ethylene polymer can have no more than 0.366 grams of N-330 carbon black per hundred grams of polymer. However, if a Group 5 carbon black is used such as N-550, which has a surface area of 42 sq. m/g., the polymer could be loaded with about 0.714 gram of N-550 carbon black per hundred grams of polymer with almost twice the amount of N-330 carbon black without producing a polymer having more than about 30 square meters of carbon black surface area per hundred grams of polymer.

According to the invention ethylene polymers are required to have a low transition metal catalyst residue in order to assure that the polymer compositions will not develop the problem of bubble formation during the rotational molding process. It is well known in the art that homopolymers and copolymers of ethylene are usually produced using transition metal catalyst systems and that the polymers produced using such systems contain residues of such catalysts. The transition metals most often used in transition metal catalyst systems are chromium, titanium and vanadium although the present invention is not limited to these transition metals and is broad enough to include any of the metals known in the art as transition metals. In order to prevent the formation of bubbles during the rotational molding process it is necessary that the polymers employed have a transition metal catalyst residue of less than 3 parts per million. Good results have been obtained in which the polymer was produced employing a chromium-based catalyst system and the polymer had a chromium catalyst residue content of 2 ppm, thus a polymer with a transition metal catalyst residue content of 2 ppm or less is preferred; however, the lower the transition metal catalyst residue the better. If polymers are available with a transition metal catalyst residue content of less than about 1 ppm then these should be used. If the polymers are prepared in a solution polymerization process employing a transition metal catalyst, it is desirable to filter the polymer solution in order to insure that the polymer produced has a transition metal residue content within specified amounts.

The temperature which is employed in the rotational molding process does have some effect on bubble formation; however, the rotational molding temperature is considered to be of secondary importance as compared to the pigment surface area per unit weight of polymer and the transition metal catalyst residue content of the polymer in the prevention of bubble formation. Relatively high temperatures are generally employed in rotational molding of the polymers of the invention. The temperatures employed can be selected over a relatively broad range. For example the lowest temperature employed is generally in the range of 350° F. (170° C.) which is determined by the melting point of the polymer employed whereas the maximum temperature, generally in the range of 700° F., 371° C., is generally determined by the decomposition temperature of the polymer. As is well known in the rotational molding art use of higher temperatures reduces the cycle time and thus higher production rates are obtained by using temperatures in the higher range. Frequently temperatures are employed which are in the range of from about 450° F. to about 625° F., 232° to 329° C.; however, for most polymers temperatures ranging from about 525° F. to about 625° F., 274° to 329° C., are most often used. When temperatures in the range of about 350° to about 450° F. (177° to 232° C.), are used minimum bubble formation is observed, and carbon blacks in Groups 2 and 3 can be used with relatively high loading of the polymer; however, long cycle times are common.

In addition to the temperature employed in the rotational molding process, the wall thickness of the molded article also can affect the formation of bubbles, possibly because longer heating periods are required in forming the thick wall. When wall thicknesses are about ½ inch (12.7 mm) or more then bubble problems are likely to be experienced. Excessive bubble formation, because higher temperatures are employed during the rotational molding process and/or because the wall thickness of the article produced is relatively large, can be substantially reduced or eliminated by employing a polymer in which the amount of solid pigment is the amount to provide a surface area of less than 25 square meters per hundred grams of polymer and the transition metal catalyst residue content is 2 ppm or less.

EXAMPLE

Individual samples of polyethylene having a melt index of 27 (ASTM D 1238, Condition E), a density of 0.967 g/cc, approximate maximum ash content of 0.02 wt. % and chromium catalyst residue content of 2 ppm maximum were compounded with 0.5 wt. % carbon black and 0.75 wt. % 2,5-dimethyl-2,5-di(t-butylperoxy)hexyne-3. Each sample was rotationally molded into pipe of 6 inches (15.2 cm) outer diameter and 20 inches (50.8 cm) in length. Each molded piece, after removal from the mold was cut lengthwise and inspected for bubbles. The nature of the carbon black used, molding temperatures employed and results obtained are given in Table 1.

Table 1
Rotational Molding of Black, Crosslinkable Polyethylene

| Run | Molding Temp. °F | Molding Temp. °C | Bubbles Observed 41[a] | Bubbles Observed 21[b] | Bubbles Observed 4[c] | Part Wall Thickness Inches | Part Wall Thickness mm. |
|---|---|---|---|---|---|---|---|
| 1 | 500 | 260 | 1 | 1 | 1 | 0.5 | 12.7 |
| 2 | 500 | 260 | 0 | 0 | 1 | 0.5 | 12.7 |
| 3 | 525 | 274 | 1 | 0 | 0 | 0.5 | 12.7 |
| 4 | 550 | 288 | 1 | 3 | 3 | 0.5 | 12.7 |
| 5 | 600 | 316 | 14 | 8 | 2 | 0.5 | 12.7 |
| 6 | 600 | 316 | 14 | not made | 2 | 0.5 | 12.7 |
| 7 | 500 | 260 | 1 | 0 | 1 | 0.25 | 6.35 |
| 8 | 600 | 316 | 0 | 0 | 0 | 0.125 | 3.18 |

[a] ASTM 2516-75, Group 3 carbon black, 82 m²/g surface area
[b] ASTM 2516-75, Group 5 carbon black, 42 m²/g surface area
[c] ASTM 2516-75, Group 9 carbon black, 8 m²/g surface area The parts produced having wall thicknesses of ¼ and ½ inches at 500° F. and ¼ inch at 600° F. and ⅛ inch at 600° F. were excellent in quality and exhibited minimum bubble formation. However, when the molding temperature was increased to 600° F. with the ½ inch thick parts, a significant number of bubbles was evident, particularly with the sample containing carbon black having a surface area of 82 m²/g. The sample containing carbon black having a surface area of 42 m²/g also exhibited an increase in bubbles; the number observed, however, was within a tolerable range for many applications.

What is claimed is:

1. A composition of matter comprising a solid polymer, an acetylenic diperoxy compound and a carbon black
   wherein the solid polymer is selected from the group consisting of ethylene homopolymers, copolymers of ethylene and at least one acyclic mono-1 olefin hydrocarbon having 3 to 8 carbon atoms per molecule, and mixtures thereof,
   wherein the amount of the acetylenic diperoxy compound is a crosslinking amount and the acetylenic diperoxy compound is selected from the group consisting of hexynes having the formula

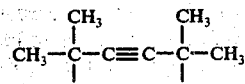

octynes having the formula

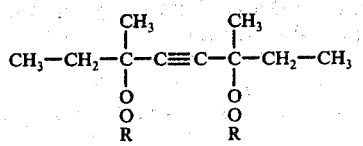

and octadiynes having the formula

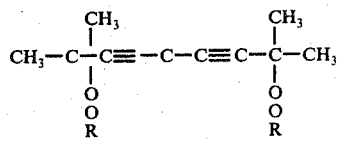

wherein R is selected from the group consisting of tertiary alkyl, alkyl carbonate, and benzoate; and
   wherein the amount of the carbon black is an amount to provide a surface area using nitrogen according to ASTM D 3037-76 of up to about 30 m²/100 g of polymer; and
   wherein said polymer has a transition metal catalyst residue content of less than about 3 parts per million.

2. The composition of matter according to claim 1 wherein the surface area of the carbon black is less than 25 m²/100 g of polymer and the transition metal catalyst residue content is 2 parts per million or less.

3. The composition of matter according to claim 1 wherein the amount of the acetylenic diperoxy compound ranges from about 0.1 to about 10 weight percent based on the weight of polymer.

4. The composition of matter according to claim 1 wherein the amount of the acetylenic diperoxy compound ranges from about 0.2 to about 5 weight percent based on the weight of polymer.

5. The composition of matter according to claim 1 wherein the amount of the acetylenic diperoxy compound ranges from about 0.5 to about 1 weight percent based on the weight of polymer.

6. The composition of claim 1 wherein the polymer is polyethylene, the acetylenic diperoxy compound is 2,5-dimethyl-2,5-di(t-butylperoxy)hexyne-3, the carbon black is selected from the group of carbon blacks within groups 5 to 9 as shown in ASTM D 2516-75, and the transition metal catalyst residue is a chromium metal in an amount of 2 parts per million or less.

7. The composition of matter of claim 6 wherein the carbon black is a group 5 carbon black as shown in ASTM D 2516-75 and the chromium catalyst residue content is 1 part per million or less.

8. A method for reducing the formation of bubbles in rotationally molded articles comprising rotationally molding a composition of matter comprising a solid polymer, an acetylenic diperoxy compound and a solid pigment
   wherein the solid polymer is selected from the group consisting of ethylene homopolymers, copolymers of ethylene and at least one acyclic mono-1 olefin hydrocarbon having 3 to 8 carbon atoms per molecule, and mixtures thereof,
   wherein the amount of the acetylenic diperoxy compound is a crosslinking amount and the acetylenic diperoxy compound is selected from the group consisting of hexynes having the formula

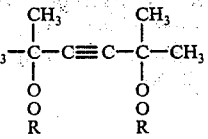

octynes having the formula

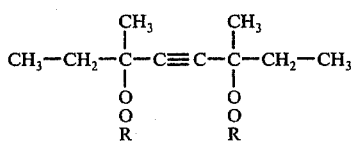

and octadiynes having the formula

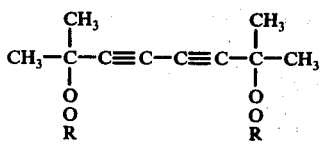

wherein R is selected from the group consisting of tertiary alkyl, alkyl carbonate, and benzoate; and
wherein the amount of the solid pigment is an amount to provide a surface area using nitrogen according to ASTM D 3037-76 of up to about 30 m²/100 g of polymer; and
wherein said polymer has a transition metal catalyst residue content of less than about 3 parts per million.

9. The method of claim 8 wherein the rotational molding temperature ranges from about 350° to about 700° F. (177° to 371° C.).

10. The method of claim 8 wherein the rotational molding temperature ranges from about 450° to about 625° F. (232° to 329° C.).

11. The method of claim 8 wherein the rotational molding temperature ranges from about 525° to about 625° F. (274° to 329° C.).

12. The method of claim 8 wherein the surface area of the solid pigment is less than 25 m²/100 g of polymer and the transition metal catalyst residue content is 2 parts per million or less.

13. The method of claim 8 wherein the amount of the acetylenic diperoxy compound ranges from about 0.1 to about 10 weight percent based on the weight of polymer.

14. The method of claim 8 wherein the amount of the acetylenic diperoxy compound ranges from about 0.2 to 5 weight percent based on the weight of polymer.

15. The method of claim 8 wherein the amount of the acetylenic diperoxy compound ranges from about 0.5 to about 1 weight percent based on the weight of polymer.

16. The method of claim 8 wherein the polymer is polyethylene, the acetylenic diperoxy compound is 2,5-dimethyl-2,5-di(t-butylperoxy)hexyne-3, the solid pigment is selected from the group of carbon blacks within groups 5 to 9 as shown in ASTM D 2516-75, and the transition metal catalyst residue is a chromium metal in an amount of 2 parts per million or less.

17. The method of claim 16 wherein the carbon black is a group 5 carbon black as shown in ASTM D 2516-75 and the chromium catalyst residue content is 1 part per million or less.

18. A composition of matter in accordance with claim 3 wherein the amount of the acetylenic diperoxy compound is not more than about 1 weight percent based on the weight of polymer.

19. A composition of matter comprising a solid polymer, an acetylenic diperoxy compound and a solid pigment
wherein the solid polymer is selected from the group consisting of ethylene homopolymers, copolymers of ethylene and at least one acyclic mono-1 olefin hydrocarbon having 3 to 8 carbon atoms per molecule, and mixtures thereof,
wherein the amount of the acetylenic diperoxy compound is a crosslinking amount and the acetylenic diperoxy compound is selected from the group consisting of hexynes having the formula

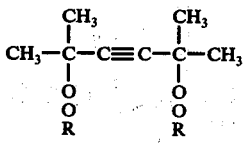

octynes having the formula

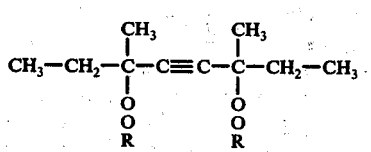

and octadiynes having the formula

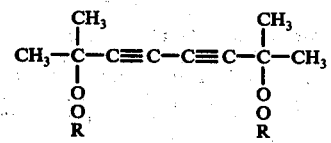

wherein R is selected from the group consisting of tertiary alkyl, alkyl carbonate, and benzoate; and
wherein the amount of the solid pigment is an amount to provide a surface area using nitrogen according to ASTM D 3037-76 of up to about 30 m²/100 g of polymer; and
wherein said polymer has a transition metal catalyst residue content of less than about 3 parts per million.

20. A composition of matter in accordance with claim 19 wherein the solid pigment is selected from the group consisting of carbon black and iron oxide.

21. A method in accordance with claim 8 wherein the amount of the acetylenic diperoxy compound is not more than about 1 weight percent based on the weight of polymer.

22. A method in accordance with claim 8 wherein the solid pigment is selected from the group consisting of carbon black and iron oxide.

* * * * *